United States Patent
Powers et al.

(10) Patent No.: US 8,375,215 B2
(45) Date of Patent: Feb. 12, 2013

(54) SOURCE SELECTION APPARATUS AND METHOD USING MEDIA SIGNATURES

(75) Inventors: Evan James Powers, Lexington, KY (US); Kevin Dean Schoedinger, Lexington, KY (US); Mark Stephen Underwood, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1342 days.

(21) Appl. No.: 11/557,128

(22) Filed: Nov. 7, 2006

(65) Prior Publication Data

US 2008/0123128 A1    May 29, 2008

(51) Int. Cl.
G06F 21/00    (2006.01)
(52) U.S. Cl. ............ 713/176; 400/76; 710/10; 235/382; 235/492
(58) Field of Classification Search .................. 713/176
See application file for complete search history.

(56) References Cited

U.S. PATENT DOCUMENTS

| | | | |
|---|---|---|---|
| 6,104,291 A | 8/2000 | Beauvillier et al. | |
| 6,246,326 B1 | 6/2001 | Wiklof et al. | |
| 6,401,141 B1 * | 6/2002 | Kumler | 710/10 |
| 6,409,401 B1 | 6/2002 | Petteruti et al. | |
| 6,425,650 B1 * | 7/2002 | Walker et al. | 347/14 |
| 6,481,907 B2 | 11/2002 | Banach et al. | |
| 6,557,758 B1 | 5/2003 | Monico | |
| 6,593,853 B1 | 7/2003 | Barrett et al. | |
| 6,747,560 B2 | 6/2004 | Stevens, III | |
| 6,750,769 B1 | 6/2004 | Smith | |
| 6,802,659 B2 | 10/2004 | Cremon et al. | |
| 6,827,279 B2 | 12/2004 | Teraura | |
| 6,899,476 B1 | 5/2005 | Barrus et al. | |
| 7,037,009 B2 | 5/2006 | Barrus et al. | |
| 7,108,177 B2 * | 9/2006 | Brookner | 235/382 |
| 2005/0280537 A1 | 12/2005 | Feltz et al. | |
| 2006/0055721 A1 | 3/2006 | Burdette et al. | |
| 2007/0016918 A1 * | 1/2007 | Alcorn et al. | 725/22 |
| 2007/0034678 A1 * | 2/2007 | Alden | 235/375 |
| 2010/0066489 A1 * | 3/2010 | Fein et al. | 340/5.8 |

OTHER PUBLICATIONS

Suneat Pranonsatit, Denchai Worasawate, and Parichart Sritanavut. "Affordable Ink-Jet Printed Antennas for RFID Applications." IEEE Transactions on Components, Packaging and Manufacturing Technology, vol. 2, No. 5, May 2012.*

* cited by examiner

*Primary Examiner* — Taghi Arani
*Assistant Examiner* — Narciso Victoria
(74) *Attorney, Agent, or Firm* — John Victor Pezdek

(57) ABSTRACT

The present disclosure relates to a method and/or apparatus for determining whether to select media for printing. This may be accomplished by identifying a media signature present in the media and identifying a data stream signature that may be printed on the media. A comparison may then be made as between the data stream signature and the media signature. Based upon the comparison media may then be selected for printing.

14 Claims, 3 Drawing Sheets

SOURCE SELECTION APPARATUS AND METHOD USING MEDIA SIGNATURES

CROSS REFERENCES TO RELATED APPLICATIONS

None

STATEMENT REGARDING FEDERALLY SPONSORED RESEARCH OR DEVELOPMENT

None

REFERENCE TO SEQUENTIAL LISTING, ETC

None

BACKGROUND

1. Field of the Invention

The present disclosure relates to printers and printing systems. More particularly, the disclosure relates to an apparatus and method to determine whether to select media based upon comparison of a media signature identified in the media and a data stream signature identified in the printer.

2. Description of the Related Art

Inkjet and laser printers have become commonplace equipment in most workplace and home computing environments. Today, many printers are multi-functional assemblies capable of printing on a large array of print media including letterhead, paper envelopes and labels. A recent innovation in the printing industry involves the manufacturing of print media with embedded radio frequency signatures in the form of Radio Frequency Identification (RFID) transponders or tags. These tags, sometimes called "Smart Labels", may be used with a variety of existing printing methods.

Embedded print media may include a backing material (sometimes referred to as the "web") upon which a label is applied, with a RFID tag sandwiched in between the label and the backing material. There may be one or more labels on the web and the sheet, as presented, may be part label and part plain paper. In some cases, there may be more than one tag arrayed across the width and down the length of the media such that multiple columns and/or rows of tags are contained on the print media.

Printing labels on a cut-sheet printer such as a laser or inkjet printer may provide a relatively wide format that allows multiple columns of labels to be used. The use of multiple columns may improve the overall rate at which the labels can be printed. At the same time, because the customer can print more than one label for each sheet printed, the relative cost of each label is greatly reduced.

Accordingly, printing on media with embedded RFID tags is rapidly becoming a growing area of label printing. Each tag on a sheet can be printed with certain data, and the RFID tag embedded within that media can be used to allow individualized processing of user associated data. For example, a shipping label might have the delivery address and a package tracking ID printed on it, while the corresponding tag would be programmed with the same information. The delivery information may then be read from the tag, whether or not the package is positioned so that the tag is visible.

Current workgroup class laser printers often provide the ability to connect multiple input source devices (e.g., trays), and to support multiple types of media (e.g., paper, cardstock, labels, transparencies, etc.). The printer may be configured to assign or indicate the type of media in each tray. This method does, however, depend upon the user properly setting the media type for each tray in the printer (e.g., via the operator panel), and properly specifying the media type for the print job (e.g., via the driver).

Media embedded with RFID tags may present a unique problem, as virtually any media type (e.g., plain paper, transparencies, etc.) can have embedded tags, and otherwise identical media (e.g., labels) may have different numbers or arrangements of RFID tags. The relatively high cost of the media makes misidentification a relatively costly issue for the user, and the large variety of possible combinations of media types and tag number/arrangement makes a straightforward addition of new "media types" in the driver list relatively difficult.

SUMMARY OF THE INVENTION

In accordance with one exemplary embodiment, the present disclosure relates to a method and/or apparatus to determine whether to select available media for printing. This may be accomplished by identifying a media signature present in one or a plurality of media and identifying a data stream signature for such media. A comparison may then be made as between the data stream signature and the media signature. Based upon the comparison a determination may be made to select media for printing.

In accordance with yet another exemplary embodiment a printing system may be provided. The system may include a printing device and at least one processor configured to identify one or more data stream signatures and one or more media input sources capable of being accessed by the printing device. The media input sources may therefore each include media containing a media signature. The system may then include one or more sensors which may identify one or more of the media signatures. The processor may then compare the data stream signatures with the identified media signatures, evaluate the comparison, and determine whether to select an available media input source.

In accordance with another exemplary embodiment, a computer-readable storage medium is provided having stored thereon instructions that when executed by a machine perform the methods described herein. For example, the instructions may identify a media signature present in the media and identify a data stream signature. The instructions may then compare the data stream signature with the media signature and determine whether to select media based upon such comparison.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
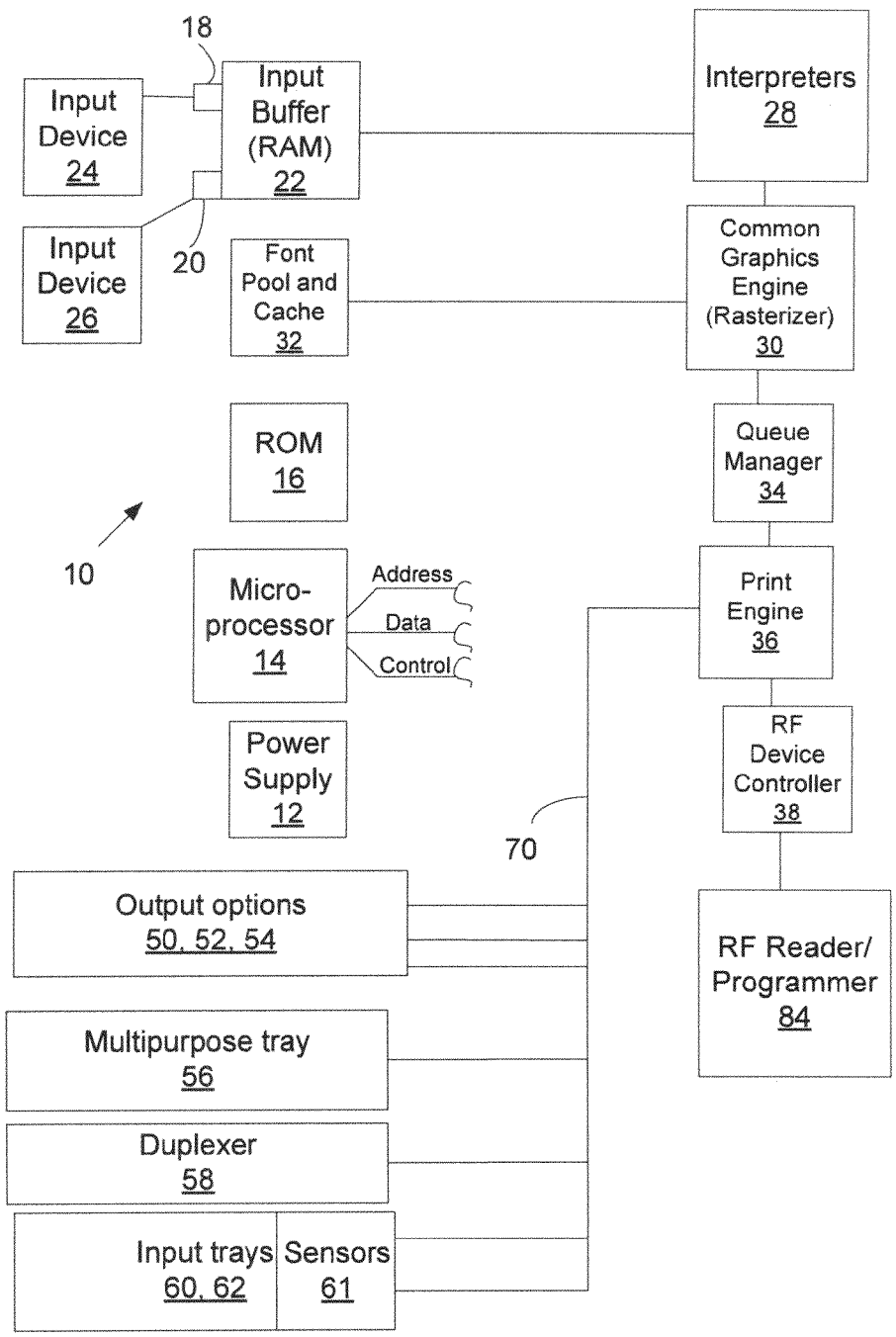
FIG. 1 is a block diagram of an embodiment of an exemplary printing system in accordance with the present disclosure.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

For simplicity the discussion below will use the terms "media", "sheet" and/or "paper" to refer to a discrete unit of media. It should be understood, however, that this term is not limited to paper sheets, and any form of discrete media is intended to be encompassed therein, including without limitation, envelopes, transparencies, postcards, labels, and the like. The disclosure herein also applies to printing devices such as an electrophotographic printer, an inkjet printer, a fax device, a copier, an all-in-one device or a multipurpose device.

Referring now to the drawings, FIG. 1 shows a hardware block diagram of a printing system, generally designated by the reference numeral 10, which may be configured to automatically select a media input source. The printing system 10 may contain certain components, such as a DC power supply 12 that may have multiple outputs of different voltage levels, a microprocessor 14 having address lines, data lines, and control and/or interrupt lines, Read Only Memory (ROM) 16, and Random Access Memory (RAM), which may be divided by software operations into several portions for performing several different functions.

Printing system 10 may also contain at least one serial input or parallel input port, network or USB port, or in many cases both types of input ports, as designated by the reference numeral 18 for the serial port and the reference numeral 20 for the parallel port. Each of these ports 18 and 20 may be connected to a corresponding input buffer, generally designated by the reference numeral 22 on FIG. 1. Serial port 18 could be connected to a serial output port of a personal computer or a workstation that may contain a software program such as a word processor or a graphics package or computer aided drawing package. Similarly, parallel port 20 could be connected to a parallel output port of the same type of personal computer or workstation containing similar types of programs. Such input devices are designated, respectively, by the reference numerals 24 and 26 on FIG. 1.

Once the text or graphical data has been received by input buffer 22, it may be communicated to one or more interpreters designated by the reference numeral 28. A common interpreter is PostScript™, which is an industry standard used by some laser printers. After being interpreted, the input data may be sent to a common graphics engine to be rasterized, which may occur in a portion of RAM designated by the reference numeral 30 on FIG. 1. To speed up the process of rasterization, a font pool and possibly also a font cache may be stored, respectively, in ROM or RAM within most laser printers, and these font memories are designated by the reference numeral 32 on FIG. 1. Such font pools and caches may supply bitmap patterns for common alphanumeric characters so that the common graphics engine 30 can easily translate each such character into a bitmap using a minimal elapsed time.

Once the data has been rasterized, it may be directed into a Queue Manager or page buffer, which may be a portion of RAM designated by the reference numeral 34. In a typical laser printer, an entire page of rasterized data may be stored in the Queue Manager during the time interval that it takes to physically print the hard copy for that page. The data within the Queue Manager 34 may be communicated in real time to a print engine designated by the reference numeral 36. Print engine 36 may include a laser light source within its printhead (not shown), and its output may be the physical marking on a piece of paper, which may be the final print output from printing system 10.

In some embodiments, the address, data, and control lines may be grouped in buses, which are electrically conductive pathways that are physically communicated in parallel (sometimes also multiplexed) around the various electronic components within printing system 10. For example, the address and data buses may be sent to all ROM and RAM integrated circuits and the control lines or interrupt lines may be directed to all input or output integrated circuits that act as buffers.

Print engine 36 may contain the core print logic which may be embodied in an Application Specific Integrated Circuit (ASIC) (not shown), for example, and which may act as the printing device's primary controller and data manipulating device for the various hardware components within the print engine 36. The bitmap print data arriving from Queue Manager 34 may be received by the core print logic, and at the proper moments may be sent in a serialized format to the laser printhead.

The print engine 36 may be in communication with a number of paper-handling devices via a communications bus 70. Some of the paper-handling devices depicted on FIG. 1 may include output options 50, 52, and 54, a multipurpose tray 56, a duplexer 58, and input trays 60 and 62. The output options may vary depending on the particular finish functionality provided by the printing system 10. Examples of output options may include, but are not limited to, a single output bin, a 5-bin multi-bin stacker and/or a single bin stapler finishing option.

Each input tray may be configured to hold media, wherein the media may contain one or more RFID tags. It may therefore be appreciated that within each input tray, and or as between input trays, the media may have different type RFID tags, each intended to have, or having, its own identifier. Furthermore, the RFID tags may differ with respect to whether or not the tags are a passive tag, which may be understood as those tags that are ultimately powered by an RFID interrogator, or an active tag, in which case the RFID tag may have its own power source. The RFID tags may also be a semi-passive tag, which have a power source (e.g. a laminar, flexible relatively low cost battery) which may be used for on tag sensing, but not to boost range. The RFID tags may also be a read only tag that contains a unique identifier that cannot be changed, or a write once read many (WORM) tag that may enable users to encode tags at the first instance of use wherein the code may then become locked. The RFID tags may also be a read/write tag that allows for updated or new information to be written to the tag.

Furthermore, within each input tray, and/or as between input trays, the media may have a different number of tags. With respect to media having the same number of tags, the tags may be arranged at different locations. For example, one media type may have a single tag located in the center of the page near the leading edge which a different media type may have two tags, one in the upper left corner and the other at mid-page on the right side. It may also be appreciated that as between input trays, the nature of the media in which the RFID tags may be embedded may differ. For example, the media may be paper, label, cardstock, transparencies, etc.

Accordingly, it may be appreciated that any given media, and/or its associated media input tray, may be identified by a media signature to identify it as distinct from other media. The media signature may therefore be developed in response to any property of the media that may be sensed. For example, whether or not the media is paper, transparent film, a label, cardstock, etc. The media signature may also be generated and be capable of identification upon detection of the type and/or number and/or position of RFID tag(s) on a given media relative to other media. Therefore, input tray 60 may hold media having one distinct media signature while input tray 62 may include media having another distinct media signature.

System 10 may be used to select a media input source (e.g., trays 60 and/or 62) for printing RFID media (e.g. a Radio Frequency Identification (RFID) tag). Although only two input trays are shown, it is contemplated that any number of input sources may be used in accordance with the present disclosure. As discussed more fully below, printing system 10 may be configured to automatically (i.e., without user intervention) select the most appropriate media input source for a given media type or recognize that no appropriate media is present.

System 10 may be configured to print a data stream on certain media, such as the RFID media noted above. Such data stream may therefore include what may be understood as a data stream signature. The data stream signature may therefore include information that corresponds to the media signature. For example, the data stream signature may indicate that it is a data stream targeted for printing on a transparent film as opposed to, e.g., paper media. The data stream signature may also include information regarding the type and/or number and/or position of the RFID tag(s) as well as the data to be programmed into each tag.

It may therefore now be appreciated that system 10 may include media signature sensors 61 (see again FIG. 1) which may be located within a media input source (e.g., input trays 60 and/or 62). These sensors when associated with a media input source may therefore be configured to detect the type and/or number and/or position of the tags in the media located in each particular tray. Media signature sensors 61 may be active continuously or may be triggered by a user event such as opening and closing the tray. The information gathered by media signature sensors 61 may be recorded by the printer firmware, which may determine the media signature present in each tray. In some embodiments, sensors 61 may be RFID transceivers that may interrogate the tags. The sensors 61 may include a metal detector (e.g., induction balance detection) or alternative sensing technologies. Further, sensors 61 may collect media signature data automatically without requiring user intervention. Using the appropriate sensing mechanisms, the methods described herein may also be used to detect the nature of the media within a given media tray, e.g., whether or not the media is paper, label, cardstock, transparencies, etc. Furthermore, the sensors may be positioned anywhere along a given media pathway within the printer, e.g. at a location prior to the photoconductive element (drum), prior to a fuser element, etc.

Printing system 10 may also include at least one paper or other type of print media positioning sensor. In some cases, the paper positioning sensors may be optoelectronic devices, which have a light source that may be a light emitting diode (LED). This may allow for sensing the position of a sheet of paper or other print media and may provide a method of determining when the leading edge or trailing edge of a sheet of print media has reached a particular point along the media pathway. Furthermore, many different types of sensors may be used other than optoelectronic devices (e.g., a limit switch to detect whether or not the printer cover is closed) without departing from the principles of the present disclosure.

Figure 2:
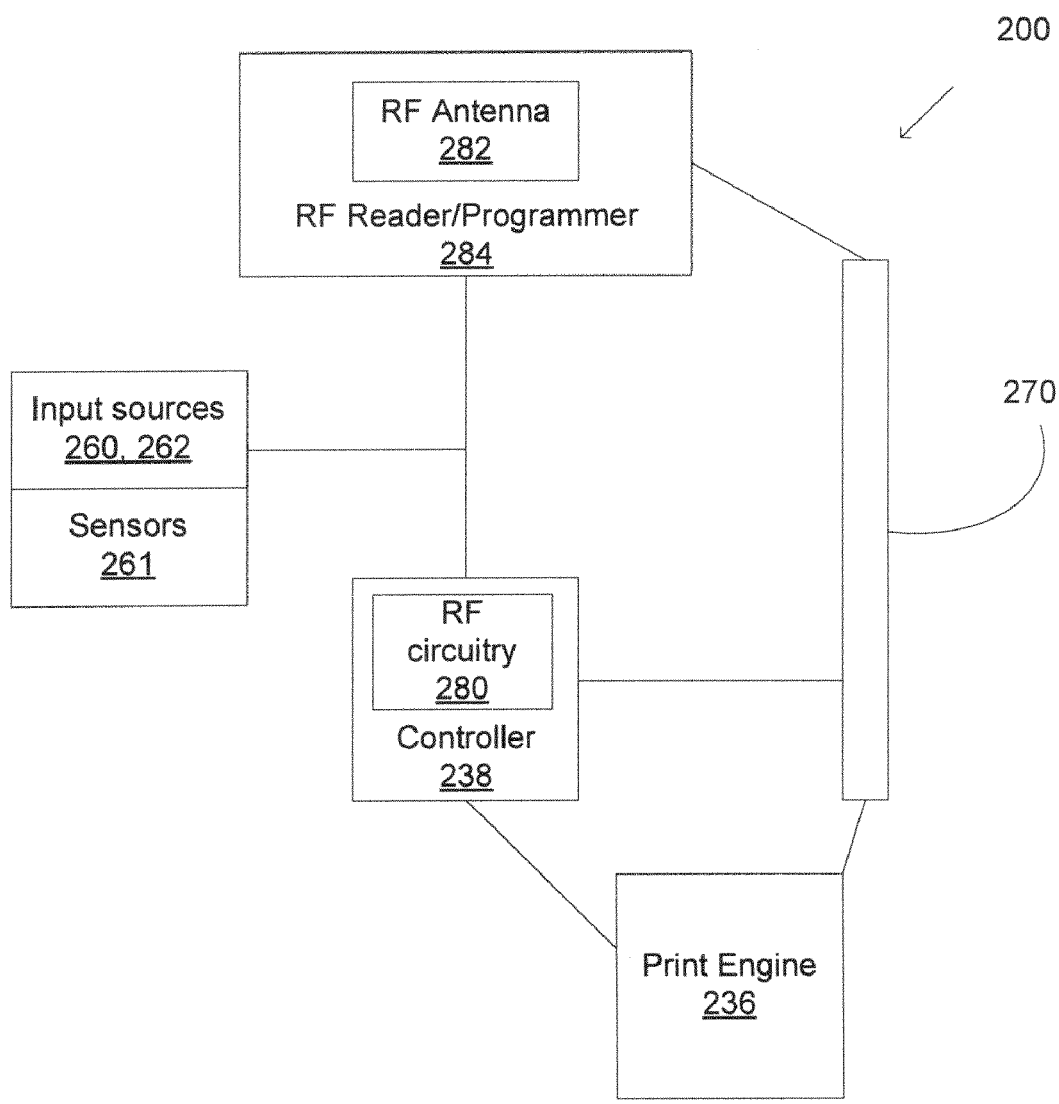
FIG. 2 is a block diagram of another exemplary embodiment of a printing system showing in greater detail a portion of a printing system having radio frequency circuitry.

Attention is now directed to FIG. 2 which illustrates in exemplary embodiment a printing system 200 showing an exemplary configuration between a controller 238, a print engine 236 and/or a RF reader/programmer 284. In some embodiments, RF device controller 238 may include circuitry 280 and may be operatively connected to communications bus 270 and print engine 236. The RF antenna 282 may be used by a radio frequency reader/programmer 284 to read and/or program an object, such as, for example, a radio frequency device tag as well as to confirm whether a tag is working or defective.

Further, RF antenna 282 may be configured to communicate with an RFID tag located within an RFID media source to determine its distinct media signature. This information may be shared with RF controller 238 and/or microprocessor 14 for comparison with the above referenced data stream signature. At the programming antenna location 284, the radio frequency control circuitry 280 may attempt to read and/or program a tag embedded in the media and then note the success or failure of this attempt. The radio frequency control circuitry 280 may then monitor or "listen" on its communications port to track the page's location as it moves through the printer. It is contemplated that controller 238 may be packaged into an aftermarket option that may be installed in a printer, such as printing device 10, without modification of the printer's other essential systems such as print engine 236 including the core print logic.

RF controller 238 may itself be in communication with input sources 260 and 262. Input sources 260, 262 may include media signature sensors 261, which may be configured to detect the media signature of the media present in each input source. This information may be transmitted telemetrically and/or via bus 270 to controller 238 or any of the other components of printing system 10.

In some embodiments, RF Reader/Programmer 284 may utilize telemetry systems and/or other remote sensing systems to communicate with media signature sensors 261. Although media signature sensors 261 are shown within input sources 260 and 262 it is contemplated that sensors 261 may be located in numerous positions upon or within printing system 10. For example, sensors 261 may be located within RF reader/programmer 284 or within print engine 236.

Figure 3:
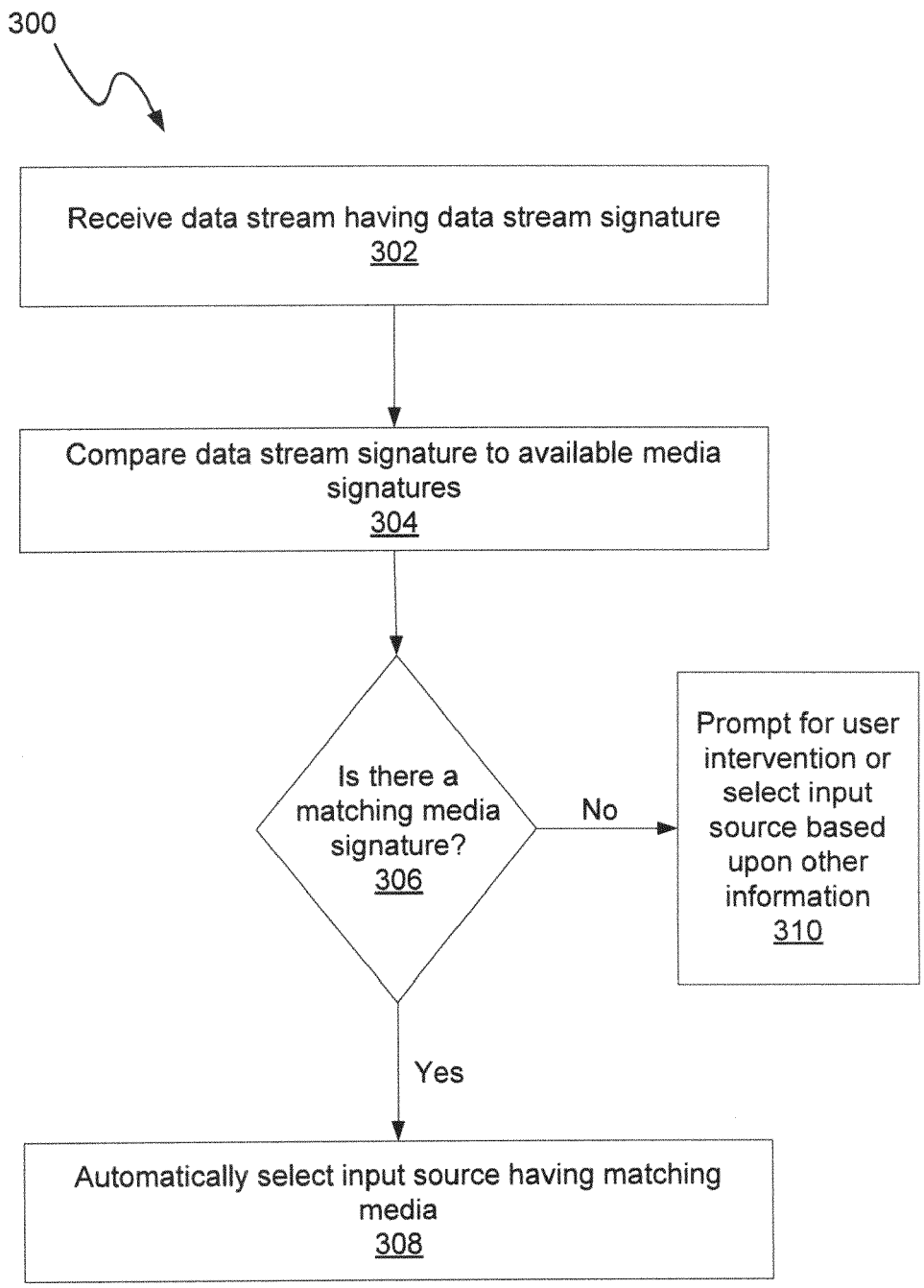
FIG. 3 is a flow diagram showing an exemplary method in accordance with the present disclosure.

FIG. 3 provides a descriptive flow diagram 300 depicting one example of the present disclosure which may operate to allow a printer to discriminate between different media that may be contained in different input trays and to select media for a current print job. As illustrated, a data stream having a data stream signature may be received by the printer (302). The data stream signature may then be compared to the media signatures present at the input sources (304). A decision may be made determining whether there has been a successful match between signatures (306). For example, when the data stream information regarding the type and/or number and/or position of the RFID tag(s) is compared to a media signature containing corresponding information regarding the type and/or number and/or position of the RFID tag(s) on a given media relative to other media, the printer may be programmed to identify and/or report the presence of one or more matches. Accordingly, the tray containing the matching media signature may then be automatically selected as the input source (308).

If no matching media signature is located, the printer may elect one of several actions. It may prompt for user intervention or it may select a tray based on other available information such as a specified source in the data stream or a default tray from the operator panel selections (310). In addition, during the media signature detection process, the printer herein may also determine which trays do not contain RFID media and may also be able to detect a lack of RFID information in the data stream. Thus, the printer may also automatically prevent the user from accidentally printing non-RFID jobs on RFID media and from printing RFID jobs on non-RFID media.

It can now be appreciated that the system 10 herein (see again FIG. 1) may include a display, such as a graphical user interface, which may show a graphical representation of a given sheet of media containing its associated media signature when a tray containing such media is selected by the printer. Moreover, the panel may show a thumbnail of the print job (e.g. a miniature display of a page to be printed sourced from the data stream signature) superimposed upon a drawing of the detected tag configuration in the selected tray (sourced from the media signature). For example, the size and/or position of RFID tags present on the media of a given input source may be made visible using a graphical user interface (GUI). The panel may then provide a user with the option of selecting or canceling the particular print job. Various displays are therefore contemplated, such as, for example, an all-points addressable display panel.

As used in any embodiment described herein, "circuitry" may comprise, for example, singularly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

It should now also be clear that embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

It should be understood that modifications can be made to the disclosure in light of the above detailed description. The terms used in the following claims should not be construed to limit the disclosure to the specific embodiments disclosed in the specification and the claims. Rather, the scope of the disclosure is to be determined entirely by the following claims, which are to be construed in accordance with established doctrines of claim interpretation.

What is claimed is:

1. A method comprising:
   identifying, in a plurality of media types to be printed in a printer and stored in corresponding media input trays in said printer, the presence of a media signature comprising information regarding at least one of a number, a type or a position of one or a plurality of radio frequency identification (RFID) tags in at least one of said plurality of stored media types;
   receiving a data stream for a print job including a data stream signature comprising information regarding at least one of a number, a type, or a position of one or a plurality of RFID tags for at least one of a plurality of media types;
   comparing the received data stream signature with said identified media signature of one of the plurality of stored media types; and
   determining whether to select one of the plurality of stored media types for printing the print job based upon said comparing of said received data stream signature to said identified media signature for one of the plurality of stored media types;
   wherein said identifying the presence of a media signature in the plurality of stored media types comprises identifying a media input tray in the plurality of media input trays containing said one of the plurality of stored media types and selecting said media input tray based upon said comparing of said received data stream signature to said identified media signature; and
   wherein the recited steps are performed in said printer.

2. The method of claim 1 comprising selecting one of the plurality of media types based upon said comparing of the received data stream signature and said identified media signature by identifying the presence or absence of a match as between:
   information in said identified media signature regarding at least one of the number, the type or the position of said one or a plurality of RFID tags located on said at least one of said plurality of stored media types; and
   information in said received data stream signature regarding at least one of the number, the type, or the position of said one or a plurality of RFID tags for said at least one of said plurality of media types.

3. The method of claim 1 wherein information regarding said type of RFID tag comprises tag identifier information.

4. A printing device comprising:
   a plurality of media input sources containing at least one media type for printing wherein said plurality of media input sources are accessible by said printing device;
   at least one sensor associated with said plurality of media input sources for sensing a media signature in said at least one media type contained within said plurality of media input sources; and
   a processor for:
      identifying said media signature sensed by said at least one sensor in said at least one media type contained within said plurality of media input sources;
      receiving from a print job a data stream signature for at least one of a plurality of media types;
      comparing said received data stream signature with said identified media signature; and
      determining whether to select media contained within said plurality of media input sources for printing based upon said comparison of said received data stream signature to said identified media signature;
      wherein said identifying said media signature sensed by said at least one sensor in said at least one media type contained within said plurality of media input sources comprises identifying a media input source in the said plurality of media input sources containing said at least one of the plurality of media types and selecting said media input source based upon said comparing of said received data stream signature to said identified media signature.

5. The printing device of claim 4 wherein the at least one sensor is selected from the group consisting of RFID transceivers, metal detectors, and optical sensors.

6. The printing device of claim 4 wherein
said at least one media type comprises one or more RFID tags and said media signature comprises information regarding at least one of a number, a type or a position of one or a plurality of RFID tags located on said at least one media type; and
said received data stream signature comprises information regarding at least one of a number, a type, or a position of one or a plurality of RFID tags for said at least one of said plurality of media types.

7. The printing device of claim 6 wherein said processor selects media type based upon said comparison of the received data stream signature and the identified media signature by identifying the presence or absence of a match as between:
information in said identified media signature regarding at least one of the number, the type or the position of one or a plurality of said RFID tags located on said at least one media type; and
information in said received data stream signature regarding at least one of the number, the type, or the position of one or a plurality of RFID tags for said at least one of said plurality of media types.

8. The printing device of claim 7 wherein said processor, upon identification of the absence of a match, performs at least one of the following:
(a) prompting a user for intervention;
(b) selecting default media; or
(c) selecting media based upon information supplied in said received data stream signature.

9. The printing device of claim 4 wherein said processor selects one of the plurality of media input sources containing said media based upon said comparison of the received data stream signature and the identified media signature.

10. The printing device of claim 4 wherein said printing device includes a display and said printing device generates an image of a print job based upon said received data stream signature and an image of said at least one media type based upon said identified media signature.

11. The printing device of claim 10 wherein said printing device prompts a user for confirmation prior to printing.

12. A non-transitory computer-readable storage medium having stored thereon instructions that when executed by a machine result in the following:
identification, in a plurality of media types to be printed in a printer and stored in corresponding media input trays in said printer, of the presence of a media signature comprising information regarding at least one of a number, a type or a position of one or a plurality of radio frequency identification (RFID) tags in at least one of said plurality of stored media types;
identification of a data stream signature in a received data stream for a print job comprising information regarding at least one of a number, a type, or a position of one or a plurality of RFID tags for at least one of a plurality of media types;
comparison of the received data stream signature with said identified media signature of one of the plurality of stored media types; and
determination whether to select one of the plurality of stored media types for printing the print job based upon said comparison of said received data stream signature to said identified media signature for one of the plurality of stored media types;
wherein said identification, in the plurality of media types to be printed in the printer and stored in corresponding media input trays in said printer, of the presence of a media signature comprises identifying a media input tray in the corresponding media input trays containing said plurality of stored media types and selecting said media input tray based upon said comparing of said received data stream signature to said identified media signature.

13. The non-transitory computer readable storage medium of claim 12 comprising selecting media type based upon said comparison of the received data stream signature and the identified media signature by identifying the presence or absence of a match as between:
information in said identified media signature regarding at least one of the number, the type or the position of said one or a plurality of RFID tags located on said at least one of said plurality of stored media types; and
information in said received data stream signature regarding at least one of the number, the type, or the position of said one or a plurality of RFID tags for said at least one of said plurality of media types.

14. The non-transitory computer readable storage medium of claim 12 wherein said medium is located in a printing device.

* * * * *